April 3, 1934.   A. B. CLARK   1,953,152
SIGNAL TRANSMITTING SYSTEM
Filed May 14, 1931   3 Sheets-Sheet 1

INVENTOR
A. B. Clark
BY
ATTORNEY

April 3, 1934.    A. B. CLARK    1,953,152
SIGNAL TRANSMITTING SYSTEM
Filed May 14, 1931    3 Sheets-Sheet 2

INVENTOR
A. B. Clark
BY
ATTORNEY

April 3, 1934.   A. B. CLARK   1,953,152
SIGNAL TRANSMITTING SYSTEM
Filed May 14, 1931   3 Sheets-Sheet 3

INVENTOR
A. B. Clark
BY
ATTORNEY

Patented Apr. 3, 1934

1,953,152

UNITED STATES PATENT OFFICE 1,953,152

SIGNAL TRANSMITTING SYSTEM

Alva B. Clark, Maplewood, N. J., assignor to American Telephone and Telegraph Company, a corporation of New York Application May 14, 1931, Serial No. 537,441

18 Claims. (Cl. 178—44)

Among the objects of my invention is to provide new and improved apparatus and a suitable method for making compensatory adjustments for the change of attenuation in signal transmitting lines due to temperature changes. Another object of my invention is to provide adjustable compensating means associated with the line rather than with a repeater. Another object is to provide for making the adjustments in a convenient and economical manner for a plurality of transmission circuits, more specifically a plurality of transmission lines in a cable. In one form of my invention there are resistances associated with the respective lines and a single common thermostatically controlled device which adjusts these resistances so as to compensate for the change of attenuation in the lines due to temperature changes. These objects of my invention, and various other objects and advantages, will become apparent on consideration of a limited number of specific embodiments of the invention, which I have chosen by way of example for disclosure in this specification. It will be understood that this disclosure relates principally to these particular examples of the invention, and that the invention will be defined in the appended claims.

Figure 1:
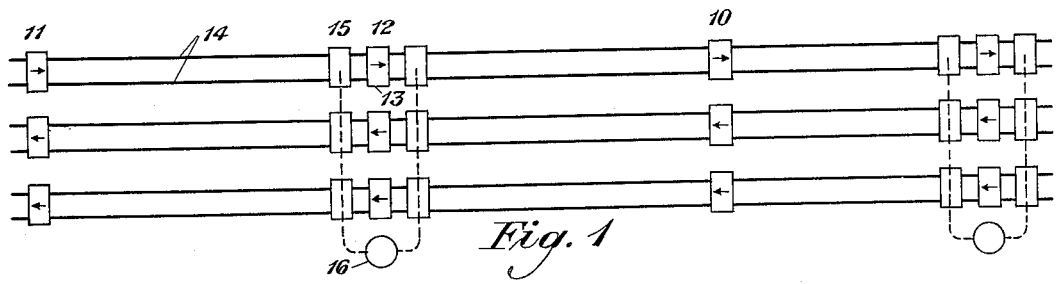
Figure 2:
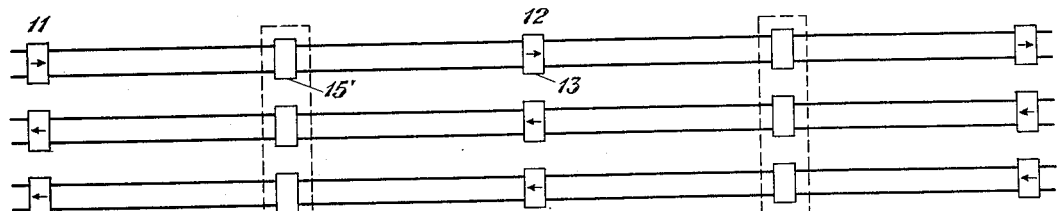
Figure 3:
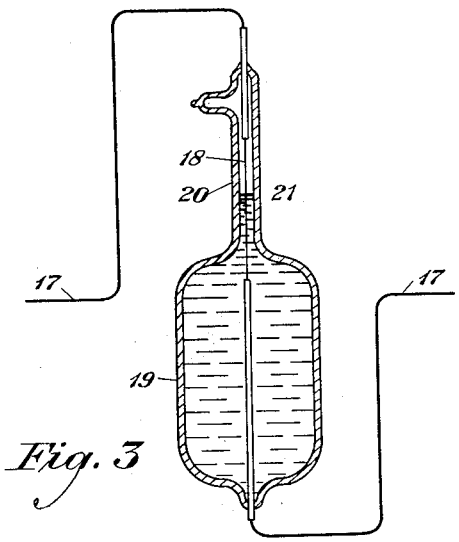
Figure 4:
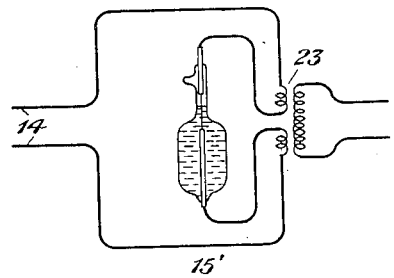
Figure 5:
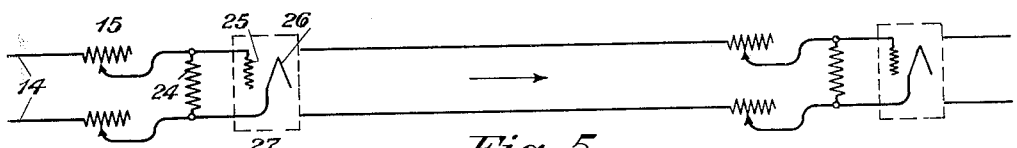
Figure 6:
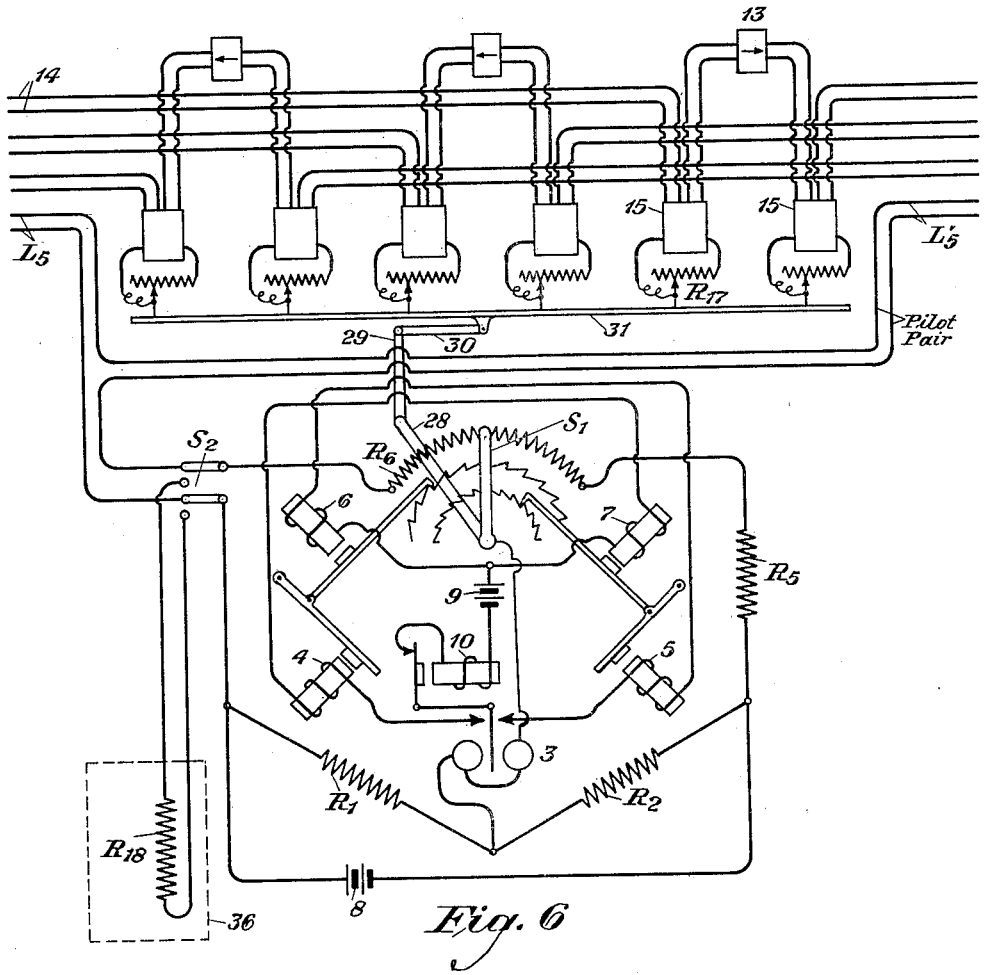
Figure 7:
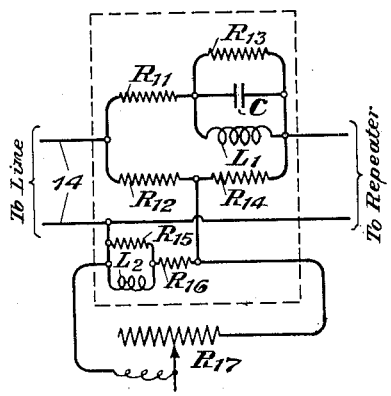
Figure 8:
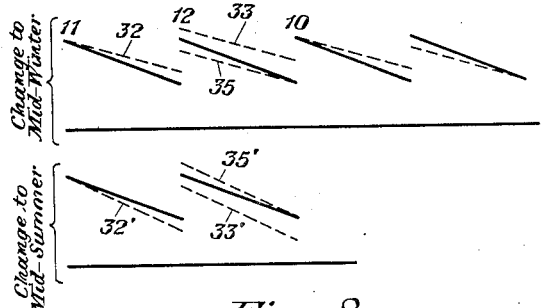
Figure 9:
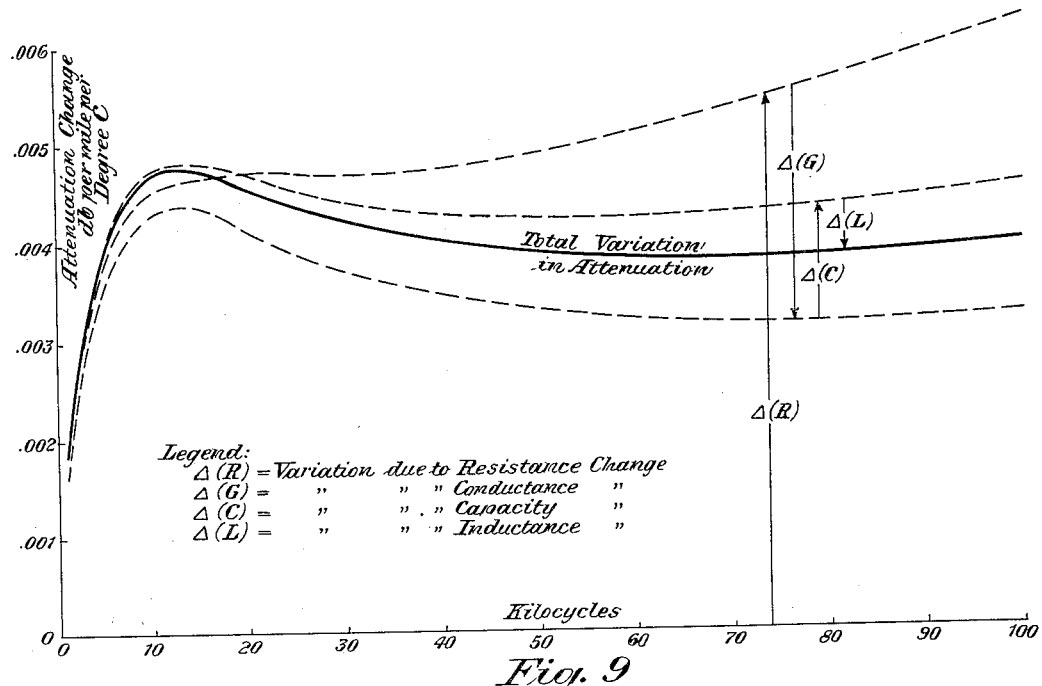
Figure 10:
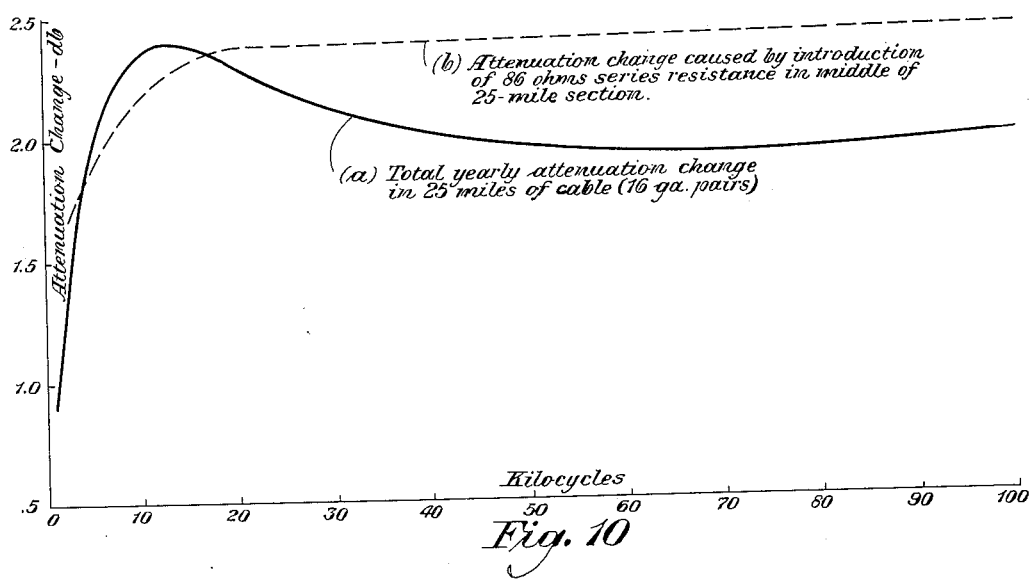
Figure 11:
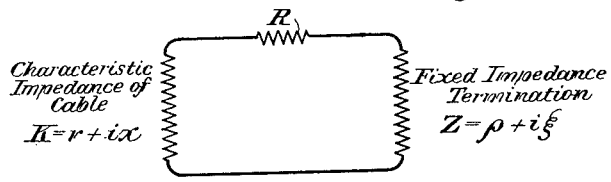

Referring to the drawings, Figure 1 is a diagram of a signal transmitting system comprising a plurality of lines and showing the adjustable compensating means located near alternate repeater stations; Fig. 2 is a similar diagram but showing the compensating means located midway between repeater stations; Fig. 3 is a diagram illustrating a certain compensator that may be employed; Fig. 4 is a diagram showing how this compensator may be employed in connection with a repeating coil so as to preserve the line balance; Fig. 5 is a diagram for use in explaining the theory of series resistances used for compensation; Fig. 6 is a general diagram showing how my resistance compensators may be used when located at a repeater station; Fig. 7 is a diagram of a compensating network that may be employed as the compensating means; Fig. 8 is a curve diagram showing the effect of temperature changes on attenuation and how these changes are compensated; Fig. 9 is a curve diagram showing the variation in attenuation of the cable due to temperature change as a function of frequency; Fig. 10 is a diagram that makes comparison of this variation with that caused by the introduction of a simple resistance; and Fig. 11 is a diagram for use in explaining how the variation in attenuation can be compensated for more accurately by associating a fixed impedance network with the variable resistance.

The diagram of Fig. 1 represents a system of long distance transmission lines in a cable. In this system the transmission is always one way over each conductor pair; in other words, the "four-wire system" is employed for two-way transmissions. The distance between two consecutive repeater stations such as 11 and 12, may be about 25 miles, and at each station such as 12, the incoming signaling currents are amplified in a one-way repeater such as 13 and sent on to the next station 10 where there is another similar amplification, and so on.

The cable comprising all the conductor pairs such as 14, may be assumed to be underground so that it will be fairly free from sudden changes of temperature. But, from mid-winter to mid-summer, the temperature of the conductors 14 may change as much as from 3° C. to 23° C. This will change the distributed resistance along each 25 mile length of conductor pair 14, and with increasing temperature there will be increasing resistance, with resultant increasing attenuation along the line.

Now the largest factor in changing the attenuation with the change in temperature is this very change in the distributed resistance. A method of compensating for the change in attenuation would therefore be to add further adjustable resistance in the line, and so adjusted that the total resistance remains constant at all times.

Such compensation would be absolutely precise throughout the frequency range used if, (1) The additional resistance introduced were uniformly distributed along the line.

(2) The change in attentuation of the cable were solely due to resistance change, and (3) The additional resistance introduced varied in the same way with frequency (over the range used) as the change in resistance of the cable.

In practice it is found much more convenient to concentrate the compensating variable resistance at one point or a few points in the line. In seeking a design which would effect satisfactory compensation when concentrated in a single unit, it has been found that the total effect in line attenuation produced by temperature variation for the range of frequencies important in carrier telephone operation over non-loaded cable circuits can be compensated for by a properly proportioned variable resistance and associated fixed impedance elements.

This is due in part to the fact that the effects of deviations in capacity and conductance with temperature tend partially to cancel and in addition to the fact that (due to skin effects) the variation in effective resistance of the line with temperature tends to be comparatively independent of frequency. As a result of the above, the effects of deviating from the conditions 1, 2 and 3 above tend to cancel partially so that, although the compensation effected by the simple variable added resistance is not precisely that required, it tends to approximate it. By associating fixed impedance elements with the variable resistance, it is possible to modify the compensation produced at different frequencies so as to obtain the accuracy required in practice.

In order to make these statements more concrete reference is made to Fig. 9, which shows the variation of attenuation with temperature per mile of cable, and the contributions to this variation which are caused by the changes with temperature of the various primary constants of the line. Fig. 10 then compares (a) the total yearly variation in attenuation in 25 miles of cable with (b) the variation in attenuation caused by the introduction of 86 ohms in the middle of the 25-mile section.

If the resistance is introduced at the end of the 25-mile section, and a fixed impedance element associated with it as a termination, as shown in Fig. 11, then the compensation can be made to simulate more accurately the variation in the cable. Under these conditions the loss, in decibels, caused by the introduction of the resistance is $$20 \log_{10} \frac{r+\rho+i(x+\xi)}{r+\rho+R+i(x+\xi)}$$

From this relation the detailed design of the fixed impedance element Z of any predetermined complexity can be determined by applying the relation to as many different frequencies in the range of compensation desired as there are unknown quantities to be evaluated.

In each 25 mile length of conductor pair 14 I interpose an attenuating network or device such as 15 in Fig. 1 or 15' in Fig. 2, and as the distributed resistance of the line section 14 increases, I provide that the attenuation in this network or device 15 shall decrease so that the overall attenuation in the combined line section and network or device shall remain constant. The networks or devices such as 15 will be explained in detail presently. In Fig. 1 there is one such network or device for each line section entering and leaving the repeater station 12, and all of them may be adjusted by a single automatic device 16 which will also be explained presently. In this system the networks or devices 15 are grouped at alternate repeater stations so they appear in Fig. 1 at station 12 but not at station 11 nor at 10.

In Fig. 2 the compensating networks or devices 15' are shown at points about midway in the line sections, that is about 12½ miles from either repeater station.

A compensating device that may be used in the location 15 of Fig. 1 or 15' of Fig. 2 is shown in Fig. 3, but it is rather specially adapted for Fig. 2. This device 15 or 15' may be in two like parts, only one of which is shown in Fig. 3; there should be one such part in each side of the line so as to preserve line balance. The line conductor 17 is made to comprise in series a fine wire section of suitable material 18 lying in the upper part of the axis of a mercury thermometer whose bulb is 19 and whose tube is 20. The mercury level is shown in Fig. 3 at 21. The conductor segment 18 is of high resistance and of material that will not amalgamate, and is largely in circuit at low temperature when the mercury level 21 is low, and when the resistance of the extended conductor 17 is low. As the seasonal temperature rises the mercury level 21 ascends so that as the resistance in the conductor 17 increases, the resistance in the conductor segment 18 increases, and thus a substantially constant overall resistance is secured in the line section between repeater stations. The units such as shown in Fig. 3 and of which two are represented by 15' in Fig. 2, will be located in pits 22 in the ground where they will not be subject to daily temperature changes, but will be subject to substantially the same seasonal temperature change as the cable conductors 14.

Whereas two thermostatic devices such as that of Fig. 3 may be employed at 15' in Fig. 2 to keep the line in balance, the same end may be attained by the use of a repeating coil 23 and the interposition of a single thermostatic regulator at the middle of one winding, as shown in Fig. 4.

The compensation on each circuit 14 may be effected by series resistances 15 as shown in Fig. 5. This introduction of variable lumped resistances in series will occasion some degree of irregularity in the line. Assuming that the transmission in Fig. 5 is in the direction of the arrow, that is, from left to right, the repeater 27 will comprise a vacuum tube with a grid 25 and a hot cathode 26 connected on the input side as shown; and across these two members will be a shunt resistance 24 which would ordinarily be adjusted as nearly as practicable to equal the characteristic impedance of the line.

The introduction of the adjustable resistances 15 will make it desirable to reduce the value of the resistance 24 somewhat. For example, if the characteristic impedance is 134 ohms, it will be better to reduce the resistance 24 to about 100 ohms, and the value of the resistances 15 taken in series will vary between zero ohms and about 86 ohms as the seasonal temperature varies. Reducing the resistance 24 and thereby shunting more of the incoming current therethrough will necessitate increasing the amplification in the amplifier 27, which in turn will increase somewhat the noise from the resistances 24 and 15. But the reduced value of the resistance 24 as compared with the characteristic resistance will compensate somewhat for the introduction of the lumped resistance 15 in series. The advantage is that it divides the reflection irregularities between high and low temperature extremes.

The apparatus at a repeating station such as 12 in Fig. 1 is shown somewhat more in detail in Fig. 6. The repeaters 13 shown at the top of Fig. 6 are rather bulky pieces of apparatus which may be somewhat widely scattered in the repeater station. The resistance compensators 15 are smaller and can be conveniently grouped together. A line such as 14, incoming from the left, goes through a particular adjustable compensator 15 and thence to the input side of the repeater 13. This affords compensation for the line section between the repeater on the left, 25 miles away, and the repeater 13. From the repeater 13 the output goes to another similar compensator 15, and through it and thence out to the right, and this last mentioned compensator 15 does duty for the 25-mile line section extending to the right.

One of these compensators 15 is shown somewhat in detail in Fig. 7. Interposed in the line 14 is the network comprising the capacity C, the inductances $L_1$ and $L_2$, and the resistances $R_{11}$, $R_{12}$, $R_{13}$, $R_{14}$, $R_{15}$, $R_{16}$ and $R_{17}$, all these reactance and resistance elements being connected as shown in Fig. 7. It will be seen that $R_{17}$ is adjustable and this same adjustable resistance appears also in Fig. 6. It lies rather across the line instead of in series, so that it requires to be increased when the distributed resistance of the line increases and vice versa, to keep the overall attenuation substantially constant. The network of Fig. 7 is particularly designed to make the compensation as accurate as possible throughout the frequency range used.

In the cable section extending to the left from Fig. 6, a conductor pair $L_5$ is taken and its ends at the next distant repeater station are closed together. Similarly for the conductor pair $L'_5$ extending to the right. These two pairs extending left and right are combined in a single series circuit forming part of one arm of the Wheatstone bridge shown at the lower part of Fig. 6. The other three arms of this bridge are $R_1$, $R_2$ and $R_3$, except that part of the resistance $R_6$ goes in the arm of the pilot pair and the remaining part of the resistance $R_6$ goes in the arm with $R_3$. The battery 8 is across one bridging connection and the polarized relay 3 is across the other bridging connection which also comprises the adjustable arm $S_1$ engaging the resistance $R_6$. Magnets 4, 5, 6 and 7 controlling pawls in engagement with ratchets associated with the arm $S_1$ are arranged as shown.

The operation of the bridge is as follows. The normal condition will be with a zero or negligible current flowing through the bridging relay 3. But suppose that due to change of temperature along the line, the resistance of the pilot pair changes. This pilot pair constituting one arm of the bridge, its change of resistance throws the bridge out of balance and a current will begin to flow through the polarized relay 3 in one direction or the other according as the resistance of the pilot pair has increased or decreased. Accordingly, the armature of the polarized relay 3 will make contact on one side or the other and energize either the magnets 4 and 7 or 5 and 6 as the case may be. The magnet 10 in series with the said armature will also be energized and will interrupt the circuit intermittently so that the magnet 4 or 5 will operate intermittently and through the associated pawl and ratchet will step the arm $S_1$ one way or the other until the resistance $R_6$ has been reapportioned between the pilot pair arm and the arm $R_3$ of the bridge so as to restore its balance.

The arm $S_1$ is connected through the shaft 28, crank 29 and link 30 with the bar 31 carrying the respective adjustable contact members for all the network resistances $R_{17}$. Thus when the resistance of the pilot pair changes due to temperature changes, it will of course be true that the resistances of all the other pairs 14 in the cable sections therewith will change correspondingly, and the adjustment of the arm $S_1$ that makes the proper compensation for the pilot wire change of resistance is also applied to adjust the resistances $R_{17}$ to make the proper compensation for the respective lines 14.

By the switch $S_2$ the resistance $R_{18}$ may be substituted for the pilot wire. This resistance $R_{18}$ is a local resistance in a pit 36 so as to be subject to nearly the same seasonal variation of temperature as the underground cable pairs 14.

Referring to Fig. 8, the upper diagram shows the attenuation for transmission from left to right. Repeater stations being located at 11, 12, 10, etc., the downward sloping solid line as from 11 to 12 indicates the attenuation in the line section between those stations. In other words, the ordinates for the sloping line give the logarithm of the current intensity at corresponding points along the line. The solid line is drawn for an average normal condition which will occur in spring and fall about half-way between mid-winter and mid-summer seasonal extremes. The dotted lines 32 and 33 indicate the attenuations for extreme mid-winter conditions when the attenuation would be reduced by about 1.3 decibels for each line section between repeaters. If the repeater at 12 gave the same amplification as with the solid line conditions, then the level would become higher, and yet higher at successive repeater stations as shown by the dotted lines 32 and 33. To obviate this, the attenuations are increased in the networks 15 on both sides of the repeater at station 12 so that the current intensities along the two line sections adjacent to station 12 are as given by the dotted lines 32 and 35. Thus the currents come in at the next repeater station 10 to the right of station 12 always at the same normal intensity; and the same explanation applies for the next succeeding pair of line sections to the right, and so on.

The diagram at the lower part of Fig. 8 shows the change for extreme mid-summer conditions. Here the resistance along the line sections is increased so that the attenuation in the line from station 11 to station 12 is given by 32', and if the amplification of the repeater at station 12 were the same as for spring and fall normal, the current intensity would be given by the line 33' from repeater station 12 over the line section to repeater station 10 at the right. Thus from station to station the currents would get weaker and weaker. To correct this, the attenuation in the networks 15 on both sides of the repeater at station 12 is decreased so that the current goes out from station 12 and over the line section to the right in accordance with the dotted line 35'.

I claim:

1. The method of compensating for variation of distributed attenuation due to temperature variations in a signal transmission line which consists in exposing a distinct temperature sensitive element to similar variations and thereby oppositely varying the attenuation in a lumped impedance device interposed in said line.

2. In the transmission of signaling currents over conductors the method of compensating for variation of attenuation due to temperature changes in the conductors which consists in interposing resistance in said conductors, adjusting it in accordance with a temperature sensitive element subjected to the same temperature changes as the conductor, and thereby varying the interposed resistance in degree according to the required compensation.

3. The method of signaling over metallic conductors which consists in transmitting electrical signal currents over said conductors to a distance at which the attenuation becomes as great as is permissible, then amplifying in a repeater and transmitting likewise again, and so on, and interposing variable resistances and adjusting them in accordance with temperature variations of an element subjected to the same temperature conditions as said conductors so as to compensate for the change of attenuation due to the temperature variations.

4. The method of compensating for variation of distributed attenuation due to temperature variation in a signal transmission line which consists in testing the temperature to which said line is subjected and thereby oppositely varying the attenuation in a lumped impedance device interposed between successive repeaters in said line.

5. In combination, a signal transmission line, repeaters interposed therein, adjustable resistances in said line outside said repeaters to compensate for attenuation changes in the line due to temperature changes therein, an element exposed to the same temperatures as said line, and means actuated by temperature changes in said element to effect the adjustment of said resistances.

6. In combination, a signal transmission line, repeaters interposed therein, adjustable resistances in said line outside the said repeaters, means to adjust said resistances to effect compensation for attenuation changes in the line due to temperature changes therein, and an element subjected to temperature conditions similar to those applying to said line and adapted to control the operation of said means.

7. In combination, a signal transmission line subject to variation of its distributed impedance, a lumped impedance element in said line means to adjust said element to vary the attenuation therethrough oppositely to the variation of the distributed impedance in the line, and a controlling element for said means subjected to conditions similar to those which cause variation of the said line impedance.

8. In combination, a signal transmission line subject to variation of its distributed impedance, repeaters interposed in said line, lumped impedance elements in said line, one such element in each section of the line between the repeaters, a separate element affected by the same causes that vary the said line impedance, and means controlled by said element to adjust said impedance elements to vary the attenuation therethrough oppositely to the variation of the distributed impedance on the line.

9. In combination, a signal transmitting line, a mercury thermometer comprising a bulb and a tube, said bulb being placed subject to temperature conditions similar to those affecting said line, a high resistance wire in the axis of said tube whereby the varying attenuation in the line due to temperature changes is compensated by oppositely varying resistance in said axial wire.

10. In combination, an electric conductor, and a compensator for temperature attenuation changes in the electric conductor comprising a mercury thermometer exposed to substantially the same temperature conditions as the said conductor, and a high resistance wire in the axis of the tube of said thermometer and in series with said conductor.

11. In combination at a repeater station, a plurality of repeaters, a plurality of lines incoming and outgoing, adjustable resistance compensators interposed therein on both sides of each repeater, and common means for adjusting said compensators said means being subject to seasonal temperature conditions similar to those for the said lines.

12. In combination at a repeater station, a plurality of repeaters, a plurality of lines incoming and outgoing, respective networks interposed across said lines on both sides of the respective repeaters, each such network comprising an adjustable shunt resistance, a thermostatic element subject to seasonal temperature conditions similar to those for the said lines, and means governed thereby to adjust the said resistances so that the variation of attenuation through each corresponding network shall compensate the variation of distributed attenuation in the corresponding line sections between repeaters.

13. In combination at a repeater station, a plurality of repeaters, a plurality of lines incoming and outgoing, adjustable attenuation compensators in said lines on both sides of each repeater, a Wheatstone bridge, a resistance element in one arm of the bridge exposed to seasonal temperature conditions similar to those for the lines entering and leaving the repeater station, and means associated with said bridge and actuated by unbalance thereof to adjust the attenuation compensators.

14. In the transmission of signaling currents over conductors, the method of compensating for different degrees of variation of attenuation at different frequencies over a considerable frequency range due to temperature changes in the conductors which consists in interposing resistance adjusted in degree according to the required compensation, and making the adjustment of said interposed resistance in accordance with an element exposed to the same causes that produce variation of attenuation over said conductors.

15. In the transmission of signaling currents over conductors, the method of compensating for different degrees of variation of attenuation at different frequencies over a considerable frequency range due to temperature changes in the conductors which consists in interposing shunt and series impedance elements and adjusting one of them in accordance with temperature changes in an element exposed similarly to the said conductors.

16. In combination, a signal transmission line, repeaters interposed therein, a network of impedance elements partly in series and partly in shunt in said line outside said repeaters, means to adjust at least one of said elements to effect compensation for the varying degree of change of attenuation at various frequencies due to temperature changes in the line, and a controlling element for said means said element being exposed like said line to the causes that vary the attenuation of said line.

17. In combination, a plurality of signal transmitting lines and a plurality of common repeater stations in succession along those lines, and resistance compensators at alternate repeater stations interposed in the associated line sections on both sides of the respective repeaters for those lines.

18. In combination, a plurality of signal transmitting lines, repeater stations in succession along those lines, resistance compensators interposed in each such line on both sides of its repeater at alternate stations, and means to adjust said compensators to vary the attenuation therethrough oppositely to the variation of distributed attenuation on the respective lines.

ALVA B. CLARK.